United States Patent [19]

Smith

[11] 4,331,867
[45] May 25, 1982

[54] PHOTOCONDUCTIVE INSTRUMENT

[75] Inventor: Sherrel C. Smith, College Station, Tex.

[73] Assignee: Chromaco, Inc., Abilene, Tex.

[21] Appl. No.: 161,036

[22] Filed: Jun. 19, 1980

[51] Int. Cl.³ .............................................. G01D 5/34
[52] U.S. Cl. ............................ 250/231 R; 250/214 R
[58] Field of Search ......................... 250/231 R, 214 R

[56] References Cited

U.S. PATENT DOCUMENTS 4,107,661 8/1978 Crosby ........................ 250/231 R X Primary Examiner—David C. Nelms
Assistant Examiner—Darwin R. Hostetter
Attorney, Agent, or Firm—Pravel, Gambrell, Hewitt, Kirk, Kimball & Dodge

[57] ABSTRACT

The invention is directed to an instrument control apparatus capable of regulating the flow of electric current by detecting relative movement between an indicator and a control zone. A light source is positioned close to the control zone so that illumination from the control zone will change responsive to movement of the indicator. Illumination from the control zone is sensed and electrical resistance is varied in response to relative movement between the indicator and control zone for varying an output voltage. A first predetermined reference voltage is generated and the output and reference voltages are compared and a first predetermined output current is generated when one of the voltages is greater than the other one. A first circuit supplies electric current to the instrument. The first circuit is regulated by closing the first circuit and allowing electric current to flow through the first circuit when one of the conditions of an output current either above or below the first predetermined output current is created, the circuit opening and interrupting the flow of current when the other of the conditions occurs. A lamp circuit supplies electric current to the light source, the light source generating an output voltage when it is on. A second predetermined reference voltage is generated which is lower than the light source output voltage. The light source output and second reference voltages are compared and a second output current is generated when the light source output voltage is greater than the second reference voltage. The first circuit is opened for interrupting the flow of current to the instrument when the second output current is below a predetermined level and closed when the second output current is above the predetermined level.

10 Claims, 5 Drawing Figures

PHOTOCONDUCTIVE INSTRUMENT

BACKGROUND OF THE INVENTION

This invention relates to instrument control circuits and, more particularly, to an electric circuit which utilizes a photoconductive sensor for detecting when a gauge indicator is in a control zone for regulating the flow of electric current to an instrument.

Many laboratory and industrial instruments are monitored by visually readable gauges which indicate when the instrument is operating within safe or optimum parameters. One such instrument is a high-speed liquid chromatograph where liquid is circulated under relatively high pressures. It is essential that the liquid be maintained within a predetermined pressure range in order to protect the machine from damage and prevent an accident from occurring. Because these instruments must be run for relatively long periods of time it is impractical for an operator personally to monitor the pressure gauge to make sure that proper operating conditions are maintained. Although gauges are available which have built-in electric, contact-type limit switches which automatically turn off the machine when the gauge indicator moves out of a predetermined control zone, these devices are not totally reliable because the contacts can corrode in the laboratory atmosphere or otherwise become ineffective and fail to turn off the instrument when a critical pressure is reached.

As an alternative to mechanical switching devices, photoconductive gauge monitoring devices have been developed which use one or more photoconductive light sensors for determining when the gauge indicator either enters or leaves a predetermined zone on a gauge. However, none is known which can simply be connected to an existing gauge without electrical or mechanical modification of the gauge or instrument and which provides fail-safe features which are essential when operating expensive equipment at high pressures or temperatures. Further, none of the known monitoring systems uses a single photoconductive sensor in conjunction with a circuit which allows the instrument to continue to operate in a cycle mode or alternatively to turn the instrument on or off at either a high or low setting and, in addition, provides a fail-safe feature such as an automatic turn off for the instrument if the lamp which is used to illuminate the photoconductor burns out or if the sensing circuit should otherwise malfunction.

SUMMARY OF THE INVENTION

A control circuit is provided in accordance with the invention which can be built into new instruments or retrofitted onto existing instruments without any modification of the gauge or instrument. The control circuit can easily be adjusted for adapting to the operational parameters of most conventional gauges for automatically turning the instrument on and off under predetermined conditions. If the circuit should malfunction in any way the instrument will also be automatically turned off.

The control circuit includes a light source which can be positioned to illuminate the control zone portion of a gauge. A photoconductive sensing device senses illumination reflected from the control zone of a gauge which has a face formed with a high reflecting surface and changes electrical resistance in response to relative movement between a relatively non-reflective gauge indicator and the control zone for varying the voltage drop at the wiper of a potentiometer which is applied to the − input of a comparator. A reference voltage from a Zener diode is applied to a + input of the potentiometer. When the gauge indicator is in the control zone a relatively low level of light is sensed by a phototransistor which in turn creates a relatively high resistance in a low power transistor so that the voltage drop at the wiper is below that from the Zener diode. When these conditions occur the comparator generates an output current and closes a relay switch which allows electric current to flow through a circuit to which the instrument is connected. The instrument remains operational as long as this condition is maintained.

When the gauge indicator moves out of the control zone, a greater amount of light is reflected off of the gauge and sensed by the phototransistor which causes a relatively low resistance in the low power transistor and a voltage drop at the wiper which is slightly greater than that from the Zener diode. Under these conditions, the voltage applied to the − input to the comparator is greater than that applied to the + input and no comparator output current is generated so that the flow of electric current through the circuit is interrupted and the instrument is turned off. When the gauge indicator moves back into the control zone and lowers the level of reflected light, the comparator output current is again generated which operates to close the relay switch and allow current to flow back to the instrument. A visual or audible warning device can be connected in parallel to the instrument for warning the operator when the instrument is turned off.

A voltage/current dividing lamp circuit provides current to a light source or bulb so that when the bulb is on voltage from the bulb which is applied to a + input of the comparator is greater than a reference voltage applied to a − input. Under these conditions the comparator generates an output current which operates to close a second relay switch for supplying electric current to the overall circuit including the instrument and to the sensing system. If the bulb burns out the reference voltage applied to the − input is greater so that there is no output current from the comparator, which operates to open the second relay switch and prevent electric current from flowing to the instrument.

A pilot light can be wired into the second relay for providing a visual indication of when the lamp is working. A normally closed bypass switch around the second relay can be provided for initially allowing current to flow through the sensing circuit for starting the instrument.

The first relay can include a manually operable switch which allows the relay to automatically turn the machine on and off as described above when the switch is closed, but which also operates to turn the instrument off and maintain it in the off condition when the gauge indicator leaves the control zone so that the instrument does not automatically turn back on until a second switch is closed. In this way, the control circuit can be switched from a cycle mode where the instrument will automatically be turned on or off depending on the position of the gauge indicator to a limit mode where the instrument will be automatically turned off when a predetermined condition is reached and not be turned back on again until done so manually.

The control circuit is also versatile enough so that it can be set in conditions where the controlled instrument is automatically turned off when the gauge indicator moves either above or below a set point or the instrument can be maintained within predetermined parameters or outside set parameters. The control circuit also is provided with a fail-safe feature so that, for example, if the photoconductive sensing unit or the lamp malfunctions, the instrument is automatically turned off.

The foregoing control circuit satisfies a need for providing a control system which can easily be connected to an existing gauge and adjusted to the desired operational parameters. The operator has a choice of several operation modes and he or she can be confident that the instrument will be maintained within set parameters and automatically be turned off if the control circuit malfunctions. A monitoring device which incorporates the control circuit can be applied to any type of instrument where a gauge can provide a visual indication of the operating condition of the instrument.

BRIEF DESCRIPTION OF THE DRAWING

A better understanding of the invention can be obtained when the detailed description of a preferred embodiment set forth below is considered in conjunction with the accompanying drawings, in which.

DETAILED DESCRIPTION OF THE PREFERRED EMBODIMENTS

Figure 1:
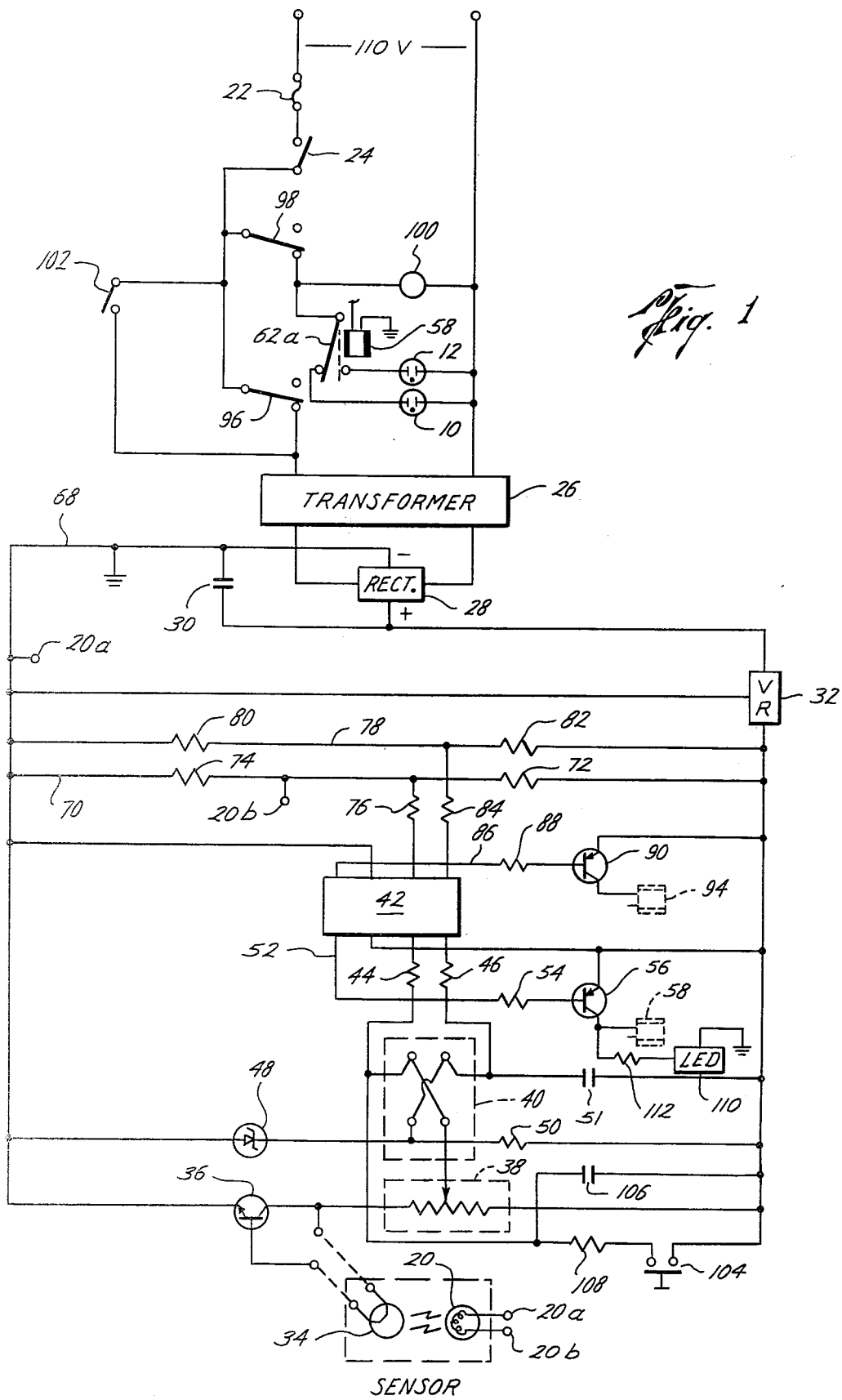
FIG. 1 is a circuit diagram of the control circuit which is the subject of the present invention.

A control circuit which embodies the subject invention is shown in FIG. 1 and includes an electrical outlet 10 for supplying current to an apparatus or instrument (not shown) to which the control circuit is connected. A second electrical outlet 12 can be used for conducting current to a suitable visual or audio alarm system for warning the operator when the instrument is switched off by the control circuit and will be described in detail below.

Figure 2:
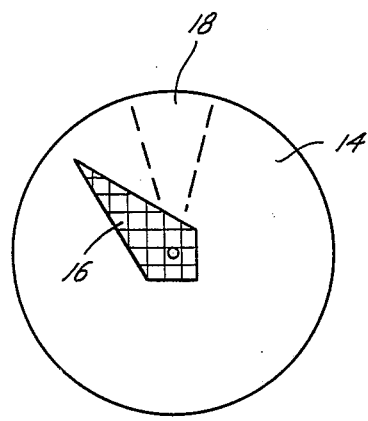
FIG. 2 is a schematic view of a gauge where an indicator is outside of a designated control zone.
Figure 3:
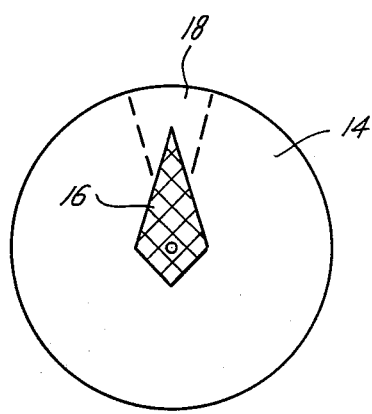
FIG. 3 is a schematic view of a gauge where the indicator is inside the designated control zone.

The instrument can include a gauge 14 of the type generally shown in FIGS. 2 and 3 where an indicator or pointer 16 is used to indicate temperature, pressure or the like. It will be assumed for the purposes of the following description that it is desired to maintain the instrument within an operating range indicated by a control zone 18 on the gauge 14, which is defined by the dotted lines as shown in FIGS. 2 and 3. It is also assumed that under normal operating conditions the indicator 16 will remain within the control zone 18 and that when the indicator 16 moves outside the control zone the instrument should be switched off. As shown by the shading on the indicator 16, it is to be formed with an outer surface which has a lower light reflectance capability than the face of the gauge 14. This difference, which is found in many commercially available gauges, allows the control circuit to operate as described so that when a lamp 20 (see FIG. 1) is placed in close proximity to the control zone 18, a greater amount of light will reflect off of the gauge 14 and be sensed by a photoconductive cell when the indicator 16 is outside the control zone 18 and in the position shown in FIG. 2 than when the indicator 16 is in the control zone as shown in FIG. 3.

Referring specifically to the circuit diagram shown in FIG. 1, 110 volt electric power is supplied from a suitable source (not shown) through a 10 ampere fuse 22 and an appropriate power switch 24 to the outlets 10 and 12 for operating the instrument and optional alarm system mentioned above. Power for the circuit which controls the flow of current to the outlets 10 and 12 is supplied through an 18 volt, 2–4 ampere transformer 26 and a full-wave bridge rectifier 28.

A 3–5 K microfarad condenser 30 smooths the output from the rectifier 28. A voltage regulator 32 maintains a constant 15 volt output for the control circuit.

Electric power is conducted to the lamp 20 and to a FPT-100 type phototransistor 34 which is used to sense the level of light reflected from the face of the gauge 14. When the phototransistor 34 receives a relatively high level of reflected light such as, for example, when the indicator 16 is in the position shown in FIG. 2, the resistance of a low power, 2N5210, NPN-type transistor 36 is relatively low. However, when the indicator 16 is in the position shown in FIG. 3 the resistance of the low power transistor 36 is relatively high.

The transistor 36 is connected to a 2K ohm, 20-turn potentiometer 38 which can be adjusted to vary the sensitivity of the control circuit to light for adjusting the permissable range of movement of the indicator 16 and regulating when the instrument is automatically turned on or off. A double-pole, double-throw switch 40 connects the potentiometer 38 with one input terminal (the − input) of a LM 339-type quad-comparator 42 through a 1M ohm resistor 44 when the switch 40 is in the position shown in FIG. 1. A second input terminal (the + input) of the comparator 42 is connected through a 1M ohm resistor 46 and the switch 40 to a reference circuit where a 12 volt, 1N4742-type Zener diode 48 applies a constant comparative input voltage to the + input of the comparator 42. A 2.2K ohm resistor 50 is located on the other side of the reference voltage circuit and a 4.7 microfarad capacitor 51 is provided parallel to the resistor 50 for grounding A.C. noise.

When the switch 40 is in the position shown in FIG. 1, the circuit is maintained in a mode where the instrument plugged into the outlet 10 is on when the indicator 16 is within the control zone 18 and is switched off, as described below, when the indicator 16 moves out of the control zone 18. One aspect of the versatility of the circuit is illustrated by the fact that when the switch 40 is reversed the circuit operates to switch the instrument off when the indicator 16 is in the control zone 18 and on when the indicator 16 is out of the control zone 18.

For proper operation of the circuit, the wiper of the potentiometer 40 is adjusted so that the voltage drop across the wiper and applied to the − input is slightly greater than the voltage applied to the + input from the Zener diode 48 when the indicator is in the position shown in FIG. 3 and a relatively low level of reflection is sensed by the phototransistor 34 so that the comparator 42 will generate an output current through a line 52 and a 1K ohm resistor 54 to an ECG322, PNP-type, power transistor 56. When a sufficient amount of current flows through the transistor 56, a coil 58 in a relay 60, shown in detail in FIG. 4, is energized which operates to move poles 62a and 62b of a double-pole, double-throw switch to the positions shown in FIGS. 1 and 4 for supplying current to the outlet 10.

When a greater amount of reflected light is sensed by the phototransistor 34 such as, for example, when the indicator 16 moves out of the control zone 18 as shown in FIG. 2, the resistance in the transistor 36 is relatively low which causes a voltage drop across the wiper which is less than the reference voltage generated by the Zener diode 48 to the comparator + input is greater so that the voltage applied than that applied to the − input. Under these conditions, there is no output current generated by the comparator 42 so that the coil 58 is not energized and the poles 62a and 62b move to their normal positions, as shown by the broken lines, where current is supplied to the outlet 12 to which an appropriate alarm system (not shown) is connected for providing a warning that the instrument is switched off. The alarm can be a warning light or suitable audio device.

Figure 4:
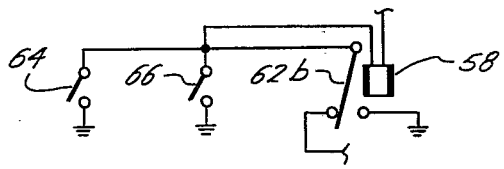
FIG. 4 is a circuit diagram of a relay used in the light sensing portion of the circuit of FIG. 1.

The relay 60 also includes a switch 64 which, when it is open as shown in FIG. 4, causes the control circuit to operate as a limit device so that when the flow of current to the instrument is interrupted as described above, current cannot be resumed to the instrument until a second switch 66 which is normally open is momentarily closed. However, when the switch 64 is closed the control circuit will operate in a cycle mode so that the instrument will be switched on and off automatically depending on the position of the indicator 16 relative to the control zone 18 as described above.

The lamp or bulb 20 has two contacts 20a and 20b which are connected between a main power line 68 and a lamp circuit 70 formed as part of a voltage/current dividing circuit. The lamp circuit includes a 240 ohm resistor 72 and a 2.2K ohm resistor 74. When the lamp 20 is operating properly it supplies an output voltage to a + input of a second circuit of the comparator 42 through a 1M ohm resistor 76. The lamp output voltage is compared with a reference voltage supplied through a reference circuit 78 which includes 2.2K ohm resistors 80 and 82 and transmits a constant reference voltage through a 1M ohm resistor 84 to a − input of the second circuit of the comparator 42.

Figure 5:
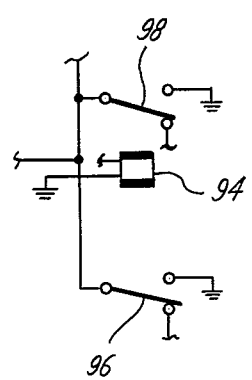
FIG. 5 is a relay used in the lamp operating portion of the circuit of FIG. 1.

When the bulb in the lamp 20 is illuminated the lamp voltage is greater than the reference voltage which operates to generate an electrical output from the comparator 42 through a line 86 which includes a 1K ohm resistor 88. When this output flows to an ECG322, PNP-type power transistor 90, its resistance is accordingly lowered which operates to allow enough current to flow to a relay 92 and energize a coil 94 as shown in FIG. 5 for maintaining the poles 96 and 98 of a double-pole, double-throw switch in the positions shown in FIGS. 1 and 5 for closing the circuit which supplies current both to the control circuit and to the electrical outlet 10 and consequently to the instrument, respectively. The pole 98 also closes the circuit in which a pilot light 100 is connected so that the operator can easily observe when the power is on.

When the lamp 20 is not working, the output voltage of the lamp 20 falls below the reference voltage, shutting off the outut current from the comparator 42 and increasing the internal resistance in the power transistor 90 so that the coil 94 will not close the poles 96 and 98 and no current will flow to the instrument or to the control circuit. In this way, a fail-safe feature is built into the control circuit so that if the lamp 20 burns out and the system cannot detect the position of the gauge indicator 16, the instrument is automatically turned off.

A pair of normally open, manually-operable, single-pole, single-throw switches 102 and 104 are provided for temporarily bypassing the normal operational functions of the phototransistor 34 and the relay 92 for starting the instrument and bringing it up to normal operational level. The switch 102 bypasses the pole 96 of the double-pole, double-throw switch in the relay 92 for providing operational current through the control circuit. The switch 104 is connected parallel to a 22 microfarad condensor 106 which operates to ground A.C. noise and in series with the comparator 42 through a 2.2K ohm resistor 108 so that a voltage can be supplied to the comparator 42 which is greater than the reference voltage generated by the Zener diode 48 for maintaining poles 62a and 62b of the relay 60 in their operating position so that the instrument can function until the indicator 16 is in a position on the gauge 14 where the control circuit will take over control of the instrument.

During set up operations, a light emitting diode (LED) 110 which is connected in parallel between the transistor 56 and coil 58 through a K ohm resistor 112, indicates when power is being transmitted to the coil 58. The LED 110 supplements the pilot light 100 which indicates when current is flowing through the remainder of the apparatus, but not the transistor 56. Thus the LED 110 faclitates correct adjustment of potentiometer 38 without requiring that an instrument be connected to plug 10 to indicate when coil 58 is energized.

The lamp 20 and phototransistor 34 can be connected to most types of gauges for controlling instruments which have operational functions that can be measured by a gauge. As shown, the control circuit is versatile enought to operate in a number of functional modes. For example, the control circuit can be set to turn the machine on or off when the gauge indicator moves either above or below a predetermined point or when the gauge indicator moves either outside or within a predetermined range or control zone.

The control circuit is set up by positioning the lamp 20 and phototransistor 34 and adjusting the potentiometer 38 so that an appropriate output voltage can be obtained for shutting the machine on or off when the non-reflective indicator reaches a predetermined position relative to the phototransistor 34. As mentioned above, the switch 64 can be opened so that when the instrument is turned off it will not automatically be turned on again until the normally open switch 66 is closed.

When the switch 64 is closed the instrument is automatically turned off when the indicator 16 moves outside of the control zone 18, provided the switch 40 is in the position shown in FIG. 1. The instrument is automatically turned on again when the indicator moves back into the control zone 18. When the switch 40 is reversed the instrument is turned on when the indicator 16 is outside of the control zone 18 and turned off when it moves into the control zone 18.

The comparator 42 can be an integrated circuit which includes four independent comparator circuits. Accordingly, a second control circuit (not shown) for controlling another instrument can be connected to the comparator 42 simply by adding a second lamp, phototransistor and switch similar to the switch 40 and connecting them to the comparator 42 for comparing an output voltage from the Zener diode 48. A second transistor and relay similar to the ones designated by reference numerals 56 and 60, respectively, can be used for controlling the flow of current to an outlet parallel to the outlet 10.

As can be seen, a portable and versatile instrument control apparatus has been developed which can be connected to most standard gauges for controlling operation of the instrument to which the gauge is attached. The control circuit can easily be adjusted to sense the position of the gauge indicator for either turning off, turning on or automatically controlling operation of the instrument. The control circuit has the built-in safety feature of automatically interrupting the flow of current to the instrument if the lamp in the circuit burns out or if the circuit malfunctions. In this way, the expensive instrument is protected from high temperatures, pressures or the like should the control circuit fail to function properly. More than one instrument can be controlled by the circuit after relatively minor changes are made.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

I claim:

1. An instrument control appartus capable of regulating the flow of electric current by detecting relative movement between an indicator and a control zone, comprising:
    (a) a light source which can be positioned close to the control zone so that illumination from the control zone will change responsive to movement of the indicator;
    (b) photoconductive means for sensing illumination from the control zone and varying electrical resistance in response to relative movement between the indicator and control zone for varying an output voltage;
    (c) means for generating a first predetermined reference voltage;
    (d) first comparing and generating means for comparing the output and reference voltages and generating a first predetermined output current when one of the voltages is greater than the other one;
    (e) a first circuit for supplying electric current to the instrument;
    (f) first regulating means connected to the output of the comparing and generating means for regulating the first circuit by closing the first circuit and allowing electric current to flow through the first circuit when one of the conditions of an output current either above or below the first predetermined output current is created by the comparing and generating means, the regulating means opening the circuit and interrupting the flow of current when the other of said conditions occurs;
    (g) a lamp circuit for supplying electric current to the light source, the light source generating an output voltage when it is on;
    (h) means for generating a second predetermined reference voltage lower than the light source output voltage;
    (i) second comparing and generating means for comparing the light source output and second reference voltages and generating a second output current when the light source output voltage is greater than the second reference voltage;
    (j) second regulating means connected to the output of the second comparing and generating means for opening the first circuit and interrupting the flow of current to the instrument when the second output current is below a predetermined level and closing the first circuit when the second output current is above the predetermined level.

2. The circuit of claim 1, wherein the control zone includes the face of a dial located in proximity to the photoconductive means which has relatively high light reflective characteristics and the indicator includes a needle movable through a space between the dial and photoconductive means and having relatively low reflective characteristics.

3. The circuit of claim 1, wherein the photoconductive means includes a photo-transistor and a low power transistor.

4. The circuit of claim 1, wherein the means for generating a first predetermined voltage includes a Zener diode for generating a constant voltage.

5. The circuit of claim 1, wherein the first and second comparing and generating means includes a comparator with at least two comparing circuits.

6. The circuit of claim 1, wherein the first and second regulating means each includes a power transistor connected between the comparing and generating means outlet and a relay.

7. The circuit of claim 6, wherein the relay connected to the first comparing and generating means includes a first switch connected on one side to the power transistor and to a ground on the other side so that when the first switch is open and the first relay opens the first circuit, a second switch connected between the power transistor and a ground must be closed before the first circuit can be closed, the first circuit closing automatically when the first switch is closed.

8. The circuit of claim 1, wherein an adjustable potentiometer is connected between the photoconductive means and the first comparing and generating means.

9. The circuit of claim 8, wherein a double-pole, double-throw switch is connected between the potentiometer and means for generating a first predetermined reference voltage, on one side, and the first comparing and generating means, on the other side.

10. The circuit of claim 1, wherein a first bypass circuit including a first bypass switch is connected parallel to the photoconductive means and a second bypass circuit including a second bypass switch is connected parallel to the second regulating means.

* * * * *